(12) United States Patent
Yu

(10) Patent No.: US 8,292,524 B1
(45) Date of Patent: Oct. 23, 2012

(54) LENS MODULE AND CAMERA MODULE HAVING SAME

(75) Inventor: Sheng-Jung Yu, New Taipei (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 13/198,944

(22) Filed: Aug. 5, 2011

(51) Int. Cl.
*G03B 17/00* (2006.01)
*G02B 7/02* (2006.01)

(52) U.S. Cl. .................................. 396/529; 359/819
(58) Field of Classification Search .................. 396/529; 359/601, 819–820; 348/335, 340
See application file for complete search history.

(56) References Cited

U.S. PATENT DOCUMENTS

| | | | |
|---|---|---|---|
| 6,072,634 A * | 6/2000 | Broome et al. ............... | 359/637 |
| 7,072,125 B2 * | 7/2006 | Chuman ........................ | 359/819 |
| 7,079,332 B2 * | 7/2006 | Tanaka ........................... | 359/822 |
| 7,417,808 B2 * | 8/2008 | Noda et al. ..................... | 359/819 |
| 7,755,858 B2 * | 7/2010 | Chen .............................. | 359/819 |
| 7,990,632 B2 * | 8/2011 | Monti ............................. | 359/819 |
| 2009/0086342 A1 * | 4/2009 | Seki ............................... | 359/820 |
| 2011/0063739 A1 * | 3/2011 | Hirata et al. ................... | 359/819 |
| 2011/0096415 A1 * | 4/2011 | Lin et al. ........................ | 359/819 |
| 2012/0206639 A1 * | 8/2012 | Matsui et al. .................. | 348/340 |

\* cited by examiner

*Primary Examiner* — Christopher Mahoney
(74) *Attorney, Agent, or Firm* — Altis Law Group, Inc.

(57) ABSTRACT

A lens module includes a first lens and a spacer. The first lens is arranged adjacent to an object side of the lens module. The first lens includes a first optical portion and a first support portion surrounding the first optical portion. The first support portion includes a first slanted annular surface which is facing inwardly of the first lens and is adjacent to an image side of the lens module. The spacer is arranged adjacent to the image side of the lens module. The spacer includes a spacer portion and a first shielding portion extending from the spacer portion. The first shielding portion covers the first slanted annular surface.

8 Claims, 4 Drawing Sheets

LENS MODULE AND CAMERA MODULE HAVING SAME

BACKGROUND

1. Technical Field

The present disclosure relates to a lens module and camera module using the lens module.

2. Description of Related Art

Generally, a lens module includes lenses, a spacer sandwiched between two adjacent lenses, and a light shielding member for eliminating any flare in the lens module. However, the additional light shielding member results in a bulky lens module.

Therefore, a lens module and a camera module, which can overcome the limitations described, is needed.

DETAILED DESCRIPTION

Figure 1:
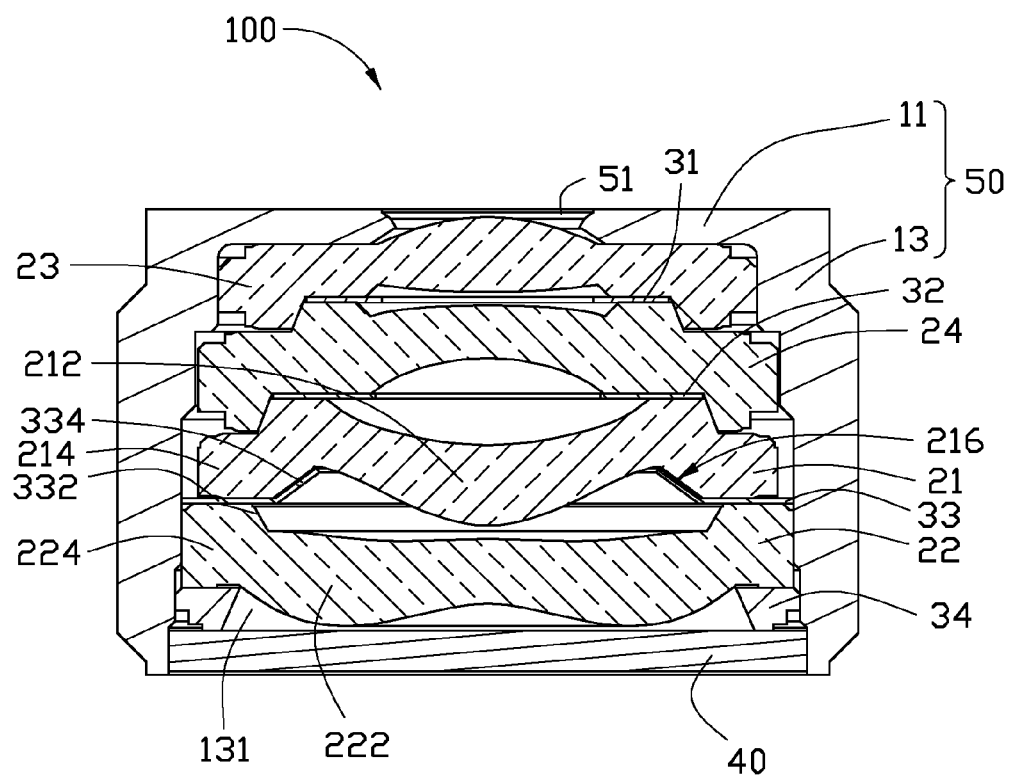
FIG. 1 is a sectional view of a lens module, according to a first embodiment.

Referring to FIG. 1, a lens module 100, according to a first embodiment, includes a first lens 21, a second lens 22, a third lens 23, a fourth lens 24, a first spacer 31, a second spacer 32, a third spacer 33, a fourth spacer 34, a glass plate 40, and a lens barrel 50. The third lens 23, the first spacer 31, the fourth lens 24, the second spacer 32, the first lens 21, the third spacer 33, the second lens 22, the fourth spacer 34, and the glass plate 40 are arranged in the order written in the lens barrel 50 from an object side to an image side of the lens module 100.

The lens barrel 50 includes a front cover 11 and a cylinder 13 extending from the edges of the front cover 11. In this embodiment, the front cover 11 is substantially circular and the cylinder 13 extends perpendicular to the front cover 11. A light incident hole 51 is defined at a center of the front cover 11. The front cover 11 and the cylinder 13 cooperatively form a receiving space 131. The light incident hole 51 is in communication with the receiving space 131 and allows light to enter into the receiving space 131.

The third lens 23 is a biconvex lens and is in contact with the front cover 11 and the cylinder 13. The fourth lens 24 is a convex lens having a convex portion facing the object side of the lens module 100. The first lens 21 is a convex lens having a convex portion facing the image side of the lens module 100. The second lens 22 is a convex lens having two convex portions facing the image side of the lens module 100. The lenses 21, 22, 23, 24 are made of plastic or glass, or some of the lenses 21, 22, 23, 24 are made of glass and the remaining lenses are made of plastic.

The first lens 21 includes a first optical portion 212 and a first support portion 214 surrounding the first optical portion 212. The first support portion 214 includes a slanted annular surface 216 which is facing inwardly of the first lens 21 and is adjacent to the image side of the lens module 100. The first optical portion 212 is a convex portion facing the image side of the lens module 100.

The second lens 22 includes a second optical portion 222 and a second support portion 224. The second support portion 224 surrounds the second optical portion 222.

The first spacer 31, the second spacer 32, and the fourth spacer 34 are substantially plate-shaped. The third spacer 33 includes a spacer portion 332 and a light shielding portion 334. The spacer portion 332 is substantially plate-shaped. The spacer portion 332 is sandwiched between the first support portion 214 and the second support portion 224. The light shielding portion 334 extends from the spacer portion 332 to cover the slanted annular surface 216. The light shielding portion 334 has a frustoconical shape. The light shielding portion 334 is configured to block and absorb flare light from passing therethrough, i.e., the light shielding portion 334 can block and absorb internal flare light in the first lens 21 impacting on the slanted annular surface 216, and can block and absorb external flare light propagating towards the slanted annular surface 216. Therefore, no additional light shield member is needed, which results in a compact lens module. Furthermore, the light shielding portion 334 does not block light from the first optical portion 212 propagating towards the second optical portion 222.

The spacers 31, 32, 33, 34 are copper plates coated with black paint. The copper plates may be shaped by punching and then painted black. In alternative embodiments, the spacers 31, 32, 33, 34 may be made of black polyester by hot-press molding. The black polyester may be obtained by mixing polyester with carbon black.

Figure 2:
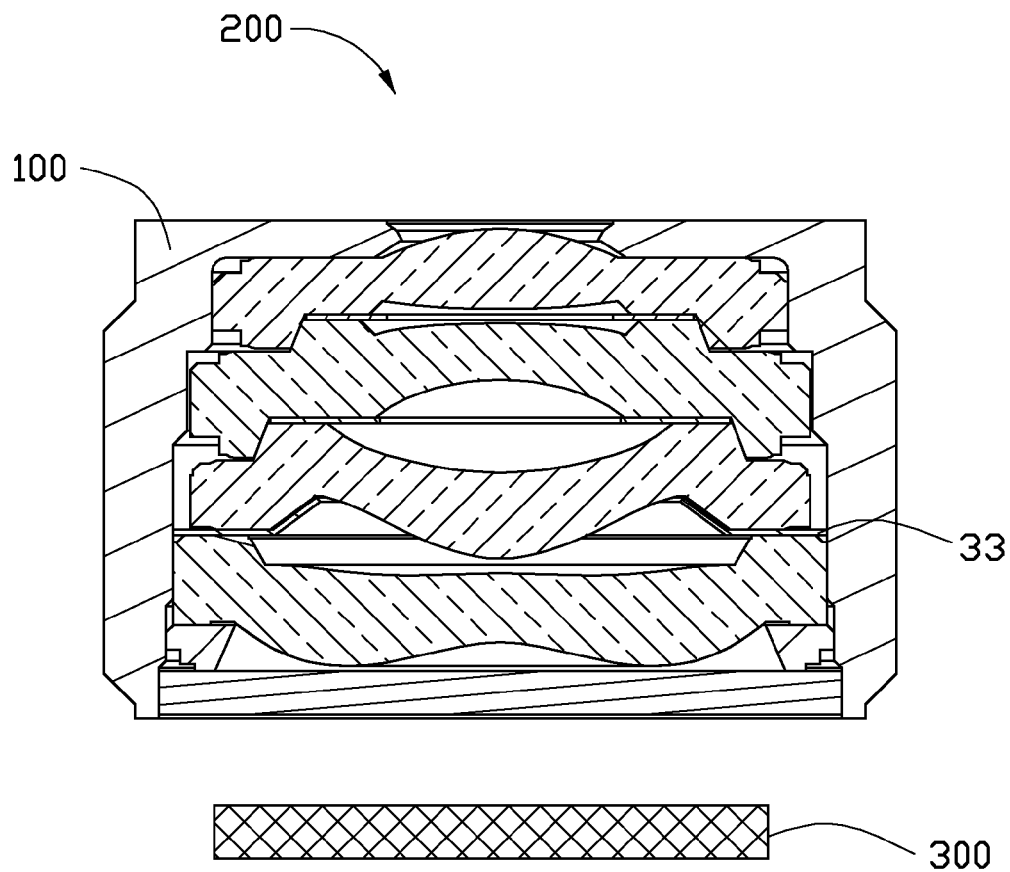
FIG. 2 is a sectional view of a camera module, according to a second embodiment.

The glass plate 40 seals an end portion of the lens barrel 50 at the image side of the lens module 100 to prevent dust and vapor from the lens barrel 50 from entering the image sensor 300 (see FIG. 2).

Referring to FIG. 2, a camera module 200, according to a second embodiment, includes the lens module 100 of the first embodiment and an image sensor 300. The image sensor 300 is arranged at the image side of the lens module 100 and receives light from the lens module 100. Since the third spacer 33 blocks and absorbs flare light, imaging quality of the camera module 200 can be improved and the camera module 200 can be compact.

Figure 3:
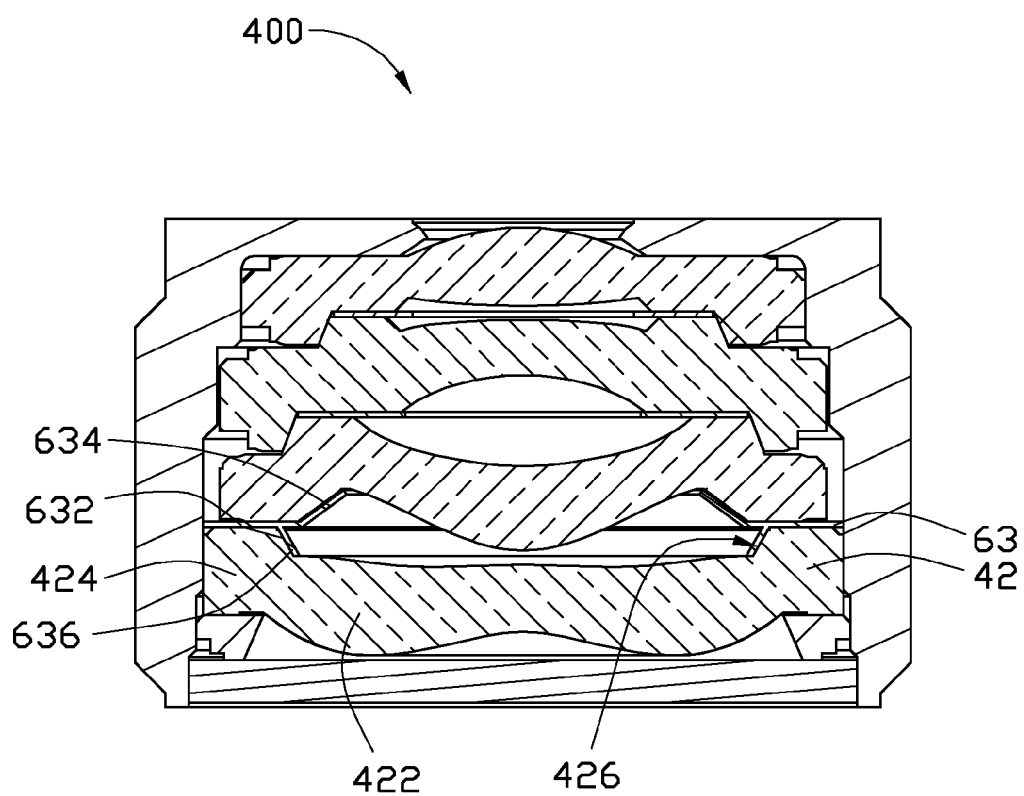
FIG. 3 is a sectional view of a lens module, according to a third embodiment.

Referring to FIG. 3, a lens module 400, according to a third embodiment, is shown. The differences between the lens module 400 and the lens module 100 of the first embodiment are that a second lens 42 and a first spacer 63 are different.

A second support portion 424 of a second lens 42 includes a second slanted annular surface 426 which is facing inwardly of the second lens 42 and is adjacent to the object side of the lens module 400.

The first spacer 63 includes a spacer portion 632, a first light shielding portion 634 and a second light shielding portion 636. The first shielding portion 634 and the second light shielding portion 636 extend from the spacer portion 632 and are located at opposite sides of the spacer portion 632. Configurations of the spacer portion 632 and the first light shielding portion 634 are the same as those of the spacer portion 332 and the light shielding portion 334 of the first embodiment. The second light shielding portion 636 extends from the spacer portion 632 to cover the second slanted annular surface 426. The second light shielding portion 636 has a frustoconical shape.

Figure 4:
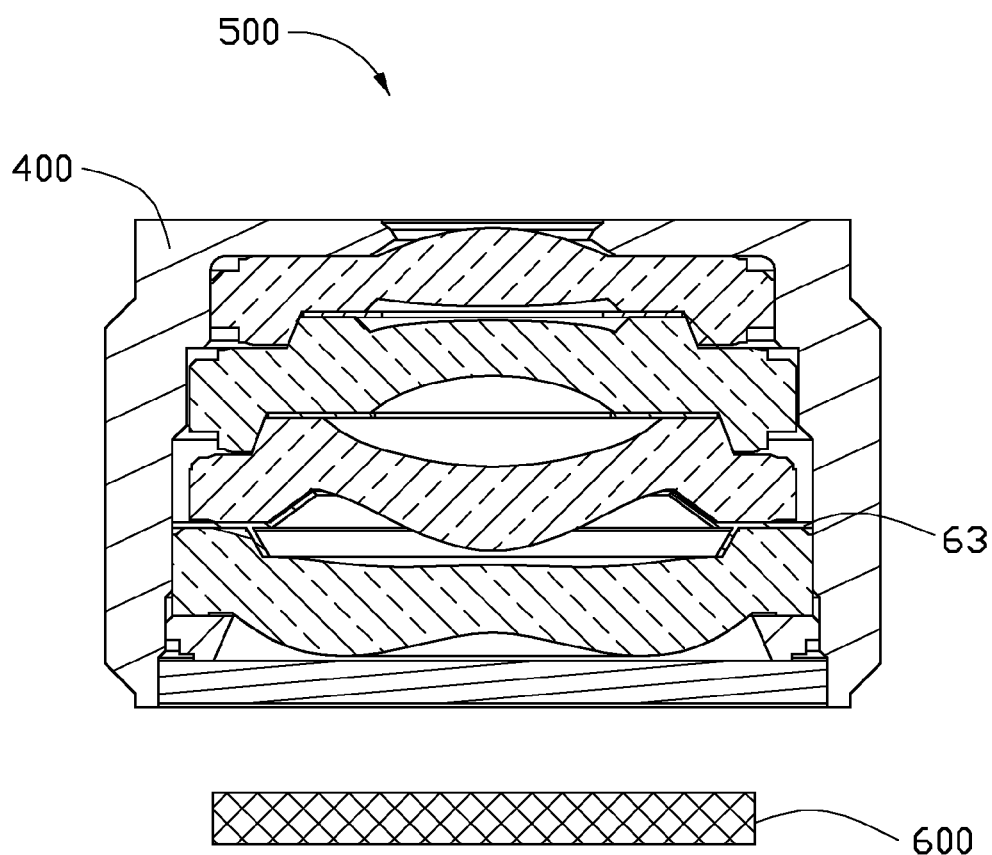
FIG. 4 is a sectional view of a camera module, according to a fourth embodiment.

Referring to FIG. 4, a camera module 500, according to a fourth embodiment, includes the lens module 400 of the third embodiment and an image sensor 600. The image sensor 600 is arranged at the image side of the lens module 400 and receives light from the lens module 400. Since the third spacer

63 blocks and absorbs flare light, imaging quality of the camera module 500 can be improved and the camera module 500 can be compact.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A lens module, comprising:
    a first lens arranged adjacent to an object side of the lens module, the first lens comprising a first optical portion and a first support portion surrounding the first optical portion, the first support portion comprising a first slanted annular surface facing inwardly of the first lens adjacent to an image side of the lens module;
    a spacer comprising a spacer portion, a first shielding portion, and a second shielding portion, the first and second shielding portions extending from the spacer portion and located at opposite sides of the spacer portion, the first shielding portion covering the first slanted annular surface; and
    a second lens comprising a second optical portion and a second support portion surrounding the second optical portion, the second support portion comprising a second slanted annular surface facing inwardly of the second lens adjacent to the object side of the lens module, the first lens, the spacer and the second lens arranged in the order written from the object side of the lens module to the image side, the spacer portion sandwiched between the first support portion and the second support portion, the second shielding portion covering the second slanted annular surface.

2. The lens module of claim 1, wherein the spacer is a copper plate coated with black paint.

3. The lens module of claim 1, wherein the spacer is made of black polyester.

4. The lens module of claim 1, further comprising a lens barrel, the first lens, the spacer and the second lens received in the lens barrel.

5. A camera module, comprising:
    a lens module, comprising:
        a first lens arranged adjacent to an object side of the lens module, the first lens comprising a first optical portion and a first support portion surrounding the first optical portion, the first support portion comprising a first slanted annular surface facing inwardly of the first lens adjacent to an image side of the lens module;
        a spacer comprising a spacer portion, a first shielding portion, and a second shielding portion, the first and second shielding portions extending from the spacer portion and located at opposite sides of the spacer portion, the first shielding portion covering the first slanted annular surface; and
        a second lens comprising a second optical portion and a second support portion surrounding the second optical portion, the second support portion comprising a second slanted annular surface facing inwardly of the second lens adjacent to the object side of the lens module, the first lens, the spacer and the second lens arranged in the order written from the object side of the lens module to the image side, the spacer portion sandwiched between the first support portion and the second support portion, the second shielding portion covering the second slanted annular surface; and
    an image sensor positioned at the image side of the lens module.

6. The camera module of claim 5, wherein the spacer is a copper plate coated with black paint.

7. The camera module of claim 5, wherein the spacer is made of black polyester.

8. The camera module of claim 5, further comprising a lens barrel, the first lens, the spacer and the second lens received in the lens barrel.

* * * * *